US006463613B1

(12) United States Patent
Thompson

(10) Patent No.: US 6,463,613 B1
(45) Date of Patent: Oct. 15, 2002

(54) PORTABLE RAMP

(76) Inventor: Laura M. Thompson, 5154 Dredger Way, Orangevale, CA (US) 95662

( * ) Notice: Subject to any disclaimer, the term of this patent is extended or adjusted under 35 U.S.C. 154(b) by 0 days.

(21) Appl. No.: 10/047,145

(22) Filed: Jan. 15, 2002

(51) Int. Cl.[7] ............................................. E01D 15/00
(52) U.S. Cl. ........................................................ 14/69.5
(58) Field of Search ................................ 14/69.5, 71.1; 404/34, 35; 414/537

(56) References Cited

U.S. PATENT DOCUMENTS

| | | | |
|---|---|---|---|
| 3,936,898 A | | 2/1976 | Poe |
| 3,984,891 A | * | 10/1976 | Weinmann .................. 14/69.5 |
| 4,329,752 A | * | 5/1982 | Forrest ........................ 14/69.5 |
| 4,368,553 A | | 1/1983 | Perry |
| 4,528,711 A | * | 7/1985 | Packer ........................ 14/69.5 |
| 4,681,482 A | * | 7/1987 | Arciszewski et al. ......... 14/2.4 |
| 4,726,516 A | | 2/1988 | Cree |
| 4,804,570 A | * | 2/1989 | Bedics ........................ 15/217 |
| 4,815,155 A | * | 3/1989 | Sommers ...................... 5/417 |
| 5,062,174 A | * | 11/1991 | DaSalvo ...................... 14/2.4 |
| 5,282,692 A | * | 2/1994 | McLeod ...................... 404/35 |
| 5,287,580 A | | 2/1994 | Nelson |
| 5,347,672 A | | 9/1994 | Everard et al. |
| 5,815,870 A | | 10/1998 | Deutch et al. |
| 5,853,281 A | * | 12/1998 | Farmer ...................... 193/35 R |
| 5,870,788 A | | 2/1999 | Witkin |
| 5,901,395 A | | 5/1999 | Vander Heiden et al. |
| D412,224 S | * | 7/1999 | Adler ......................... D30/119 |
| 5,933,898 A | | 8/1999 | Estes et al. |
| 6,099,233 A | * | 8/2000 | Craik ......................... 14/71.1 |
| 6,269,508 B1 | * | 8/2001 | Younce ....................... 14/69.5 |

FOREIGN PATENT DOCUMENTS

FR 2617223 * 6/1987 ............ E04F/11/02

* cited by examiner

Primary Examiner—Thomas B. Will
Assistant Examiner—Kristine Markovich
(74) Attorney, Agent, or Firm—Sharon H. Roddan, Esq.

(57) ABSTRACT

A collapsible, portable ramp assembly, made of light weight materials and of a unitized construction whereby all components are a permanent part of the assembly, and which can be quickly and easily deployed to form a sturdy ramp for a variety of uses. The central, load-bearing portion of the ramp is formed by many light weight, transversely positioned slats, pivotally connected to one another by several flexible straps. Rigid support of the central ramp portion is provided by a pair of strong, light weight braces that simply rotate into a longitudinal position along the ramp sides from their position along the ramp end pieces.

9 Claims, 3 Drawing Sheets

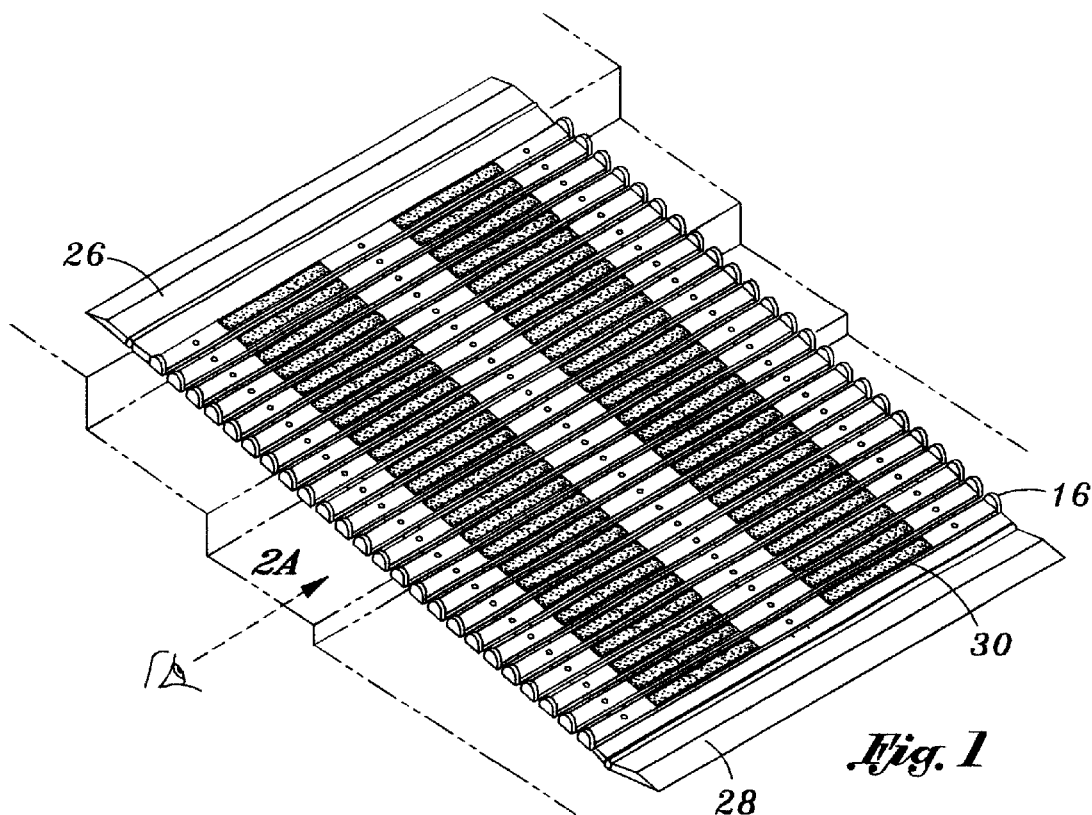
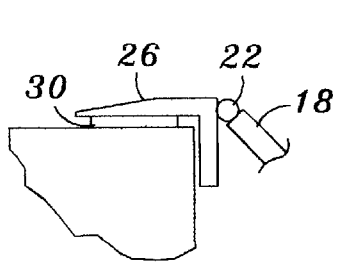
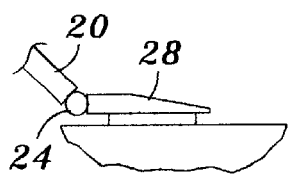
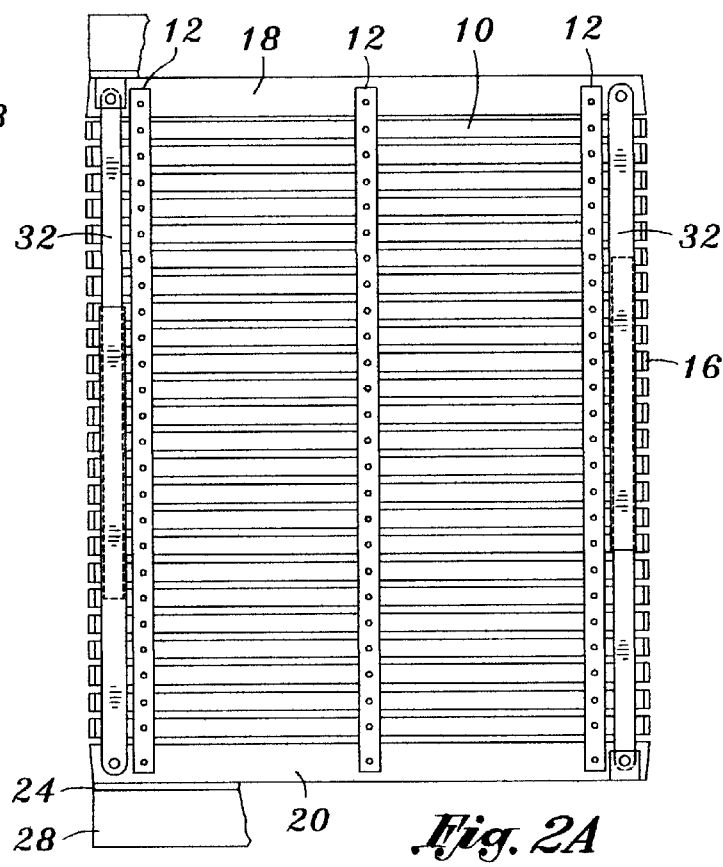

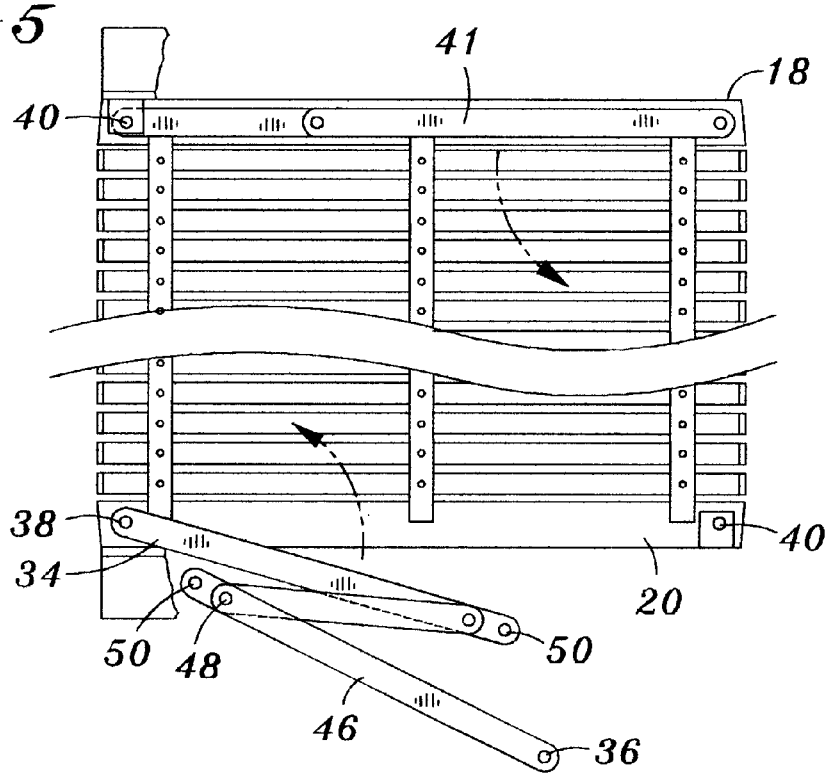
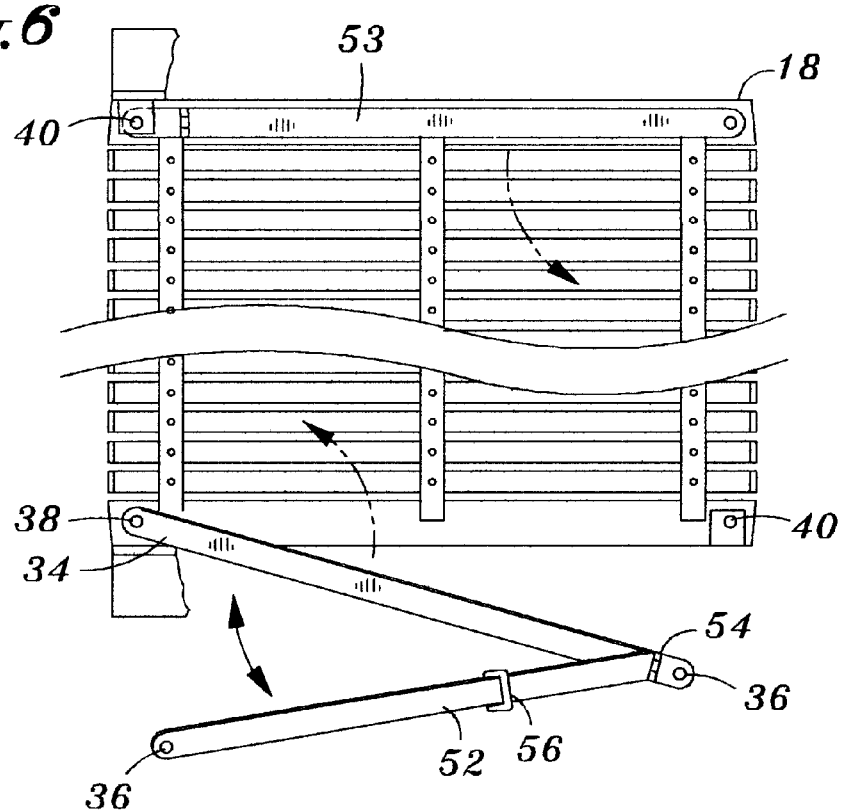

PORTABLE RAMP

CROSS REFERENCE TO RELATED APPLICATIONS

None

STATEMENT REGARDING FEDERAL SPONSORED R & D

None

REFERENCE TO A "MICROFICHE APPENDIX

None

BACKGROUND OF THE INVENTION

1) Field of the Invention

The use of ramps by vehicles and others to bridge obstacles is well known. Their shape, size, weight and portability is usually of little concern in the industrial environment. This is not true, however, to the handicapped or elderly user, since their ability to handle such conditions is severely limited. The ability to personally carry, deploy and return to storage, is a major factor in their independence.

Much of the prior art gives only partial consideration to the above concerns. In the past, when attention is given to ease of storage, we find it necessary to store several components separately, thereby increasing the risk of losing some of the components. When consideration is given to unitized construction, we are left with a large, heavy and cumbersome ramp that is difficult to store.

The prior art cited below exhibit these limiting factors. We will show that by attention to detail, a ramp overcoming these limitations can be inexpensively produced.

The present invention relates to collapsible, portable ramps of a unitary construction that are particularly suitable for use by, but not limited to, wheelchairs and other vehicles commonly used by the disabled, elderly or other persons requiring transportation assistance.

2) Description of Related Art

Everard et al. U.S. Pat. No. 5,347,672 disclosed a "portable, stowable knock-down ramp" in which one or more separate side rails must be attached to a central platform made from a series of interlocking metal extrusions. While providing the basic function of bridging a curb or a series of steps, the Everard et al. ramp construction is cumbersome to use due to the size and weight of key components, and due to the fact that ramp plates must be precisely inserted and locked into the side rail for proper and safe use. Also, the fact that the side rails are carried separately, increases their risk of loss and damage during storage.

Estes et al. U.S. Pat. No. 5,933,898 discloses a "portable wheelchair ramp" which provides a knock-down ramp in which a series of interconnected spanning panels are deployed and locked together to form the basic function of bridging a curb or a series of steps. The Estes et al. ramp construction is cumbersome to use due to the size and weight of key components and due to the fact that the spanning panels must be locked together for proper and safe use.

SUMMARY OF THE INVENTION

1) Objectives and Advantages

The present invention provides a collapsible, portable ramp assembly, made of light weight materials and of a unitized construction whereby all components are a permanent part of the assembly, and which can be quickly and easily deployed to form a sturdy ramp for a variety of uses. Due to its unique construction, the portable ramp may be easily broken down without the need for component removal. It may also be rolled up into a single, small, compact package for carrying in a tote-bag.

In the preferred embodiment, the central, load-bearing portion of the ramp is formed by many light weight, transversely positioned slats, pivotally connected to one another by several flexible straps. Rigid support of the central ramp portion is provided by a pair of strong, light weight braces that simply rotate into a longitudinal position along the ramp sides from their position along the ramp end pieces. When no longer in use, the braces are rotated back and locked into their transverse position along the end pieces of the ramp for easy storage. Since the braces need not be removed or re-attached to the central ramp portion of the assembly, the ramp is easily roll up into a single package for storage in a tote-bag suitable for hanging on the back of a wheelchair, or similar vehicle.

DESCRIPTION OF THE DRAWINGS

The details and many of the advantages provided by this invention will become clear and will be better understood by reviewing the following description and accompanying drawings, wherein:

FIG. 1 is a top perspective view of a collapsible, portable ramp assembly according to the present invention in a position of bridging a set of stairs.

FIG. 2a is an underside view of the collapsible, portable ramp showing the relationship between in a fully deployed position.

FIG. 2b is a detailed side view of the ramp top piece and top plate properly placed over a curb or step corner.

FIG. 2c is a detailed side view of the ramp bottom piece and bottom plate properly placed on a typical approach.

FIG. 5 is an underside view of the collapsible, portable ramp showing the second embodiment relationships between the "Z" braces and other ramp components in a non-deployed position.

FIG. 6 is an underside view of the collapsible, portable ramp showing the third embodiment relationships between the folding braces and other ramp components in a non-deployed position.

DETAILED DESCRIPTION

Figure 3:
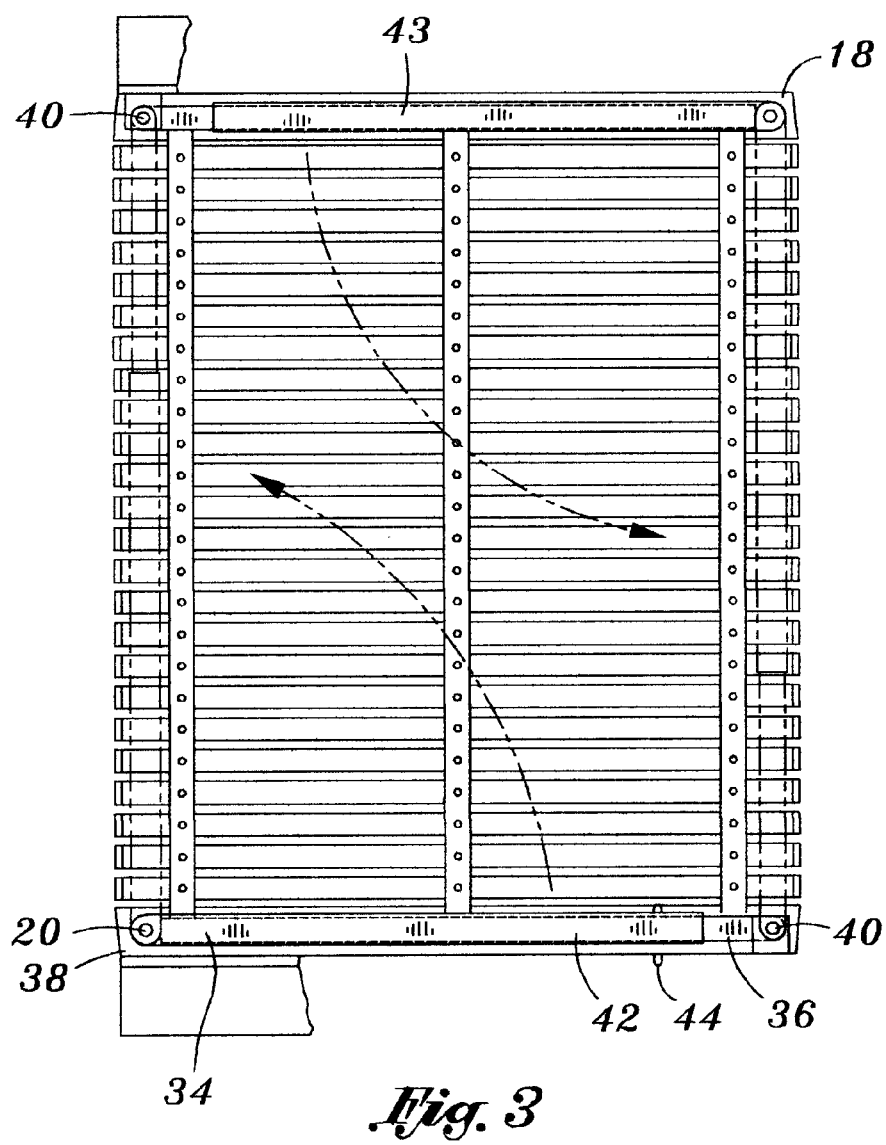
FIG. 3 is an underside view of the collapsible, portable ramp showing the first embodiment relationships between the telescoping braces and other ramp components in a non-deployed position.

A collapsible, portable ramp assembly, FIG. 1, as described in the present invention includes a central portion formed of a top piece 18 and a bottom piece 20, and having there between, a plurality of ramp slats 10, all made of light weight, but strong material such as for example aluminum alloy, steel, plastic, carbon fiber, or wood, and held together by a plurality of flexible, strong straps 12 made of a suitable flexible material such as for example leather, webbing, ribbon, or plastic. Each slat 10 has a turned up edge 16 to prevent lateral tracking of the vehicle off the ramp. Alternating slats 10 are offset on one side or the other to allow a tighter roll when the ramp is stored. A non-skid surface 30 may be added to improve traction.

As shown in FIG. 2a, each strap 12 is attached to the underside of the top piece 18 and the bottom piece 20, and to the underside of each slat 10, using rivets 14 or other suitable fasteners. Further, the top piece 18 is attached to a top plate 26 by a top hinge 22, and the bottom piece 20 is attached to a bottom plate 28 by a bottom hinge 24. As shown in FIG. 2b, the top plate 26 is "L" shaped and is made of light weight, but strong material such as for example aluminum alloy, steel, plastic, carbon fiber, or wood, and has its edge opposite the top hinge 22, tapered to match the curb or step landing surface. The top plate 26 is designed to fit against the corner of the curb or step. As shown in FIG. 2c, the bottom plate 28 is flat shaped and is made of light weight, but strong material such as for example aluminum alloy, steel, plastic, carbon fiber, or wood, and has its edge opposite the bottom hinge 24, tapered to match the approach surface. A non-skid surface 30 may be applied to the underside of the top plate 26 and the bottom plate 28 to prevent slippage where they contact their respective landing and approach points.

Further shown in FIG. 2a, a pair of braces 32, having one end permanently attached to the central portion of the ramp, and made of light weight, but strong material such as for example aluminum alloy, steel, plastic, carbon fiber, or wood, are located longitudinally on the underside of the ramp slats 10, along each side of the ramp. When locked in their deployed position, the braces 32 and the ramp slats 10 form a ramp that is both flat and rigid, and that is suitable for bridging a curb, or one or more steps, and allowing a wheeled vehicle such as for example a wheelchair, cart or scooter, to proceed up or down said curb or steps.

In the preferred embodiment, FIG. 3, the ramp is provided with a pair of telescoping braces 42 and 43, that are made of light weight, but strong material such as for example aluminum alloy, steel, plastic, carbon fiber, or wood, and are located on the underside of the ramp. The telescoping braces 42 and 43 are a permanent part of the collapsible, portable ramp assembly, and are shown in their stored position, a position transverse to the ramp direction and along the underside of the bottom piece 20 and the top piece 18, respectively. During deployment, the telescoping braces 42 and 43 are extended in length and rotated through 90 deg. of travel to a longitudinal position along the underside of each side of the ramp.

The first telescoping brace 42 has a brace fixed end 34 and a brace detachable end 36. By means of telescoping, the telescoping brace 42 has a minimum length equal to the ramp width and a maximum length equal to the ramp length. The telescoping brace 42 is locked in its minimum length and maximum length by a telescoping brace detent 44. The telescoping brace 42 has its brace fixed end 34 permanently attached to the bottom piece 20 by a pivot pin 38 allowing it to rotate from its storage position to its deployed position. In addition, the telescoping brace 42 has its brace detachable end 34 attached to the bottom piece 20 by a locking pin 40, thereby securing telescoping brace 42 in place during storage. During deployment, the telescoping brace 42 is detached from the locking pin 40, located on the bottom piece 20, and extended to its deployed length and rotated into its deployed position, where its brace detachable end 34 is re-attached to the top piece 18 by the locking pin 40. The second telescoping brace 43 is permanently attached to top piece 18 and operates in a manner equal to that described above.

Figure 4:
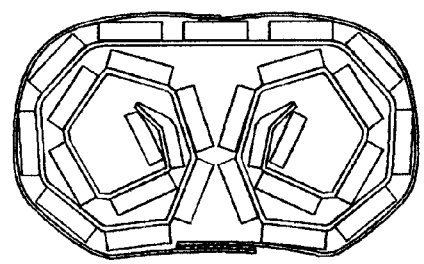
FIG. 4 is a side view of the collapsible, portable ramp in its rolled up and tied position.

As shown in FIG. 4, the collapsible, portable ramp assembly with permanently attached telescoping braces 42 and 43 in their stored position, may be rolled up from one end, or from both ends, and may be retained by, for example, one or a plurality of latches, straps, belts or ties, made of, for example, plastic, metal, carbon fiber, leather, webbing, ribbon, or other suitable material. Once rolled up, the collapsible, portable ramp assembly may be placed in a tote bag, or similar carrying case, for easy storage.

In the second embodiment, FIG. 5, the ramp is provided with a pair of "Z" braces 46 and 47 made of light weight, but strong material such as for example aluminum alloy, steel, plastic, carbon fiber, or wood, and located on the underside of the ramp. The "Z" braces 46 and 47 are permanent part of the collapsible, portable ramp assembly, and are shown folded and in their stored position, a position transverse to the ramp direction, and along the underside of bottom piece 20 and top piece 18, respectively. The "Z" brace 46 is shown in a semi-folded condition for clarity. During deployment, the "Z" braces 46 and 47 are unfolded into an elongated and straight condition, and rotated through 90 deg. of travel to a longitudinal position along the underside of each side of the ramp.

The first "Z" brace 46, has a brace fixed end 34, a brace detachable end 36, and has a plurality of folding "Z" brace sections 46, connected together by a plurality of "Z" brace hinge pins 48. By means of folding and unfolding, the "Z" brace 46 has a minimum length equal to the ramp width and a maximum length equal to the ramp length, respectively. The "Z" brace 46 is locked in its minimum length and maximum length by a plurality of "Z" brace detents 50. The "Z" brace 46 has its brace fixed end 34 permanently attached to the bottom piece 20 by a pivot pin 38, allowing it to rotate from its storage position to its deployed position. In addition, the "Z" brace 46 has its brace detachable end 34 attached to the bottom piece 20 by a locking pin 40, thereby securing it in place during storage. During deployment, the "Z" brace 46 is detached from the locking pin 40, located on the bottom piece 20, and is extended to its deployed length and rotated into its deployed position, where its brace detachable end 34 is re-attached to the top piece 18 by the locking pin 40. The second "Z" brace 47 is permanently attached to the top piece 18 and operates in a manner equal to that described above.

As shown in FIG. 4, the collapsible, portable ramp assembly ramp with permanently attached "Z" braces 46 and 47 in their stored position, may be rolled up from one end, or from both ends, and may be retained by, for example, one or a plurality of latches, straps, belts or ties, made of, for example, plastic, metal, carbon fiber, leather, webbing, ribbon, or other suitable material. Once rolled up, the collapsible, portable ramp assembly may be placed in a tote bag, or similar carrying case, for easy storage.

In the third embodiment, FIG. 6, the ramp is provided with a pair of folding braces 52 and 53 that are made of light weight, but strong material such as for example aluminum alloy, steel, plastic, carbon fiber, or wood, and are located on the underside of the ramp. The folding braces 52 and 53 are a permanent part of the collapsible, portable ramp assembly, and are shown folded and in their stored position, a position transverse to the ramp direction, and along the underside of the bottom piece 20 and the top piece 18, respectively. The folding brace 52 is shown in a semi-folded condition for clarity. During deployment, the folding braces 52 and 53 are unfolded into a straight condition, and rotated through 90 deg. of travel to a longitudinal position along the underside of each side of the ramp.

The first folding brace 52 has a brace fixed end 34, a brace detachable end 36, and has a pair of folding brace sections 52 connected together by a folding brace hinge 54. By means of folding and unfolding, the folding brace 52 has a minimum length equal to the ramp width and a maximum length equal to the ramp length, respectively. The folding brace 52 is locked in its maximum length by a folding brace clasp 56. The folding brace 52 has its brace fixed end 34 permanently attached to the bottom piece 20 by a pivot pin 38 allowing it to rotate from its storage position to its deployed position. In addition, the folding brace 52 has its brace detachable end 34 attached to the bottom piece 20 by the locking pin 40, thereby securing it in place during storage. During deployment, the folding brace 52 is detached from the locking pin 40, located on the bottom piece 20, and is extended it to its deployed length and rotated into its deployed position where its brace detachable end 34 is re-attached to the top piece 18 by the locking pin 40. The second folding brace 53 is permanently attached to the top piece 18 and operates in a manner equal to that described above.

As shown in FIG. 4, the collapsible, portable ramp assembly ramp with permanently attached the folding braces 52 and 53, in their stored position, may be rolled up from one end, or from both ends, and may be retained by, for example, one or a plurality of latches, straps, belts or ties, made of, for example, plastic, metal, carbon fiber, leather, webbing, ribbon, or other suitable material. Once rolled up, the collapsible, portable ramp assembly may be placed in a tote bag, or similar carrying case, for easy storage.

What is claimed is:

1. A collapsible, portable ramp, having:
   a top piece and a bottom piece; said top piece having an upper surface and a lower surface and said bottom piece having an upper surface and a lower surface;
   a plurality of rigid slats located between said top piece and said bottom piece;
   a plurality of flexible straps, said straps attached to said slats, said top piece and said bottom piece;
   a top plate and a bottom plate;
   a top hinge and a bottom hinge;
   said top plate is attached to said top piece by said top hinge and said bottom plate is attached to said bottom piece by said bottom hinge;
   a first brace and a second brace;
   each brace having a fixed end and a detachable end;
   said fixed end of said first brace is rotatably attached to said lower surface of said bottom piece;
   said detachable end of said first brace being detachably received in said lower surface of said bottom piece while in a storage position, and being detachably received in said lower surface of said top piece while in a deployed position;
   said fixed end of said second brace is rotatably attached to said lower surface of said top piece; and
   said detachable end of said second brace being detachably connected to said lower surface of said top piece while in a storage position, and being detachably connected to said lower surface of said bottom piece while in a deployed position.

2. The ramp as set forth in claim 1 wherein said top plate is tapered.

3. The ramp as set forth in claim 1 wherein said bottom plate is tapered.

4. The ramp as set forth in claim 1 wherein said top plate and said bottom plate are tapered.

5. The ramp as set forth in claim 1 wherein at least one of said braces is a telescoping brace.

6. The ramp as set forth in claim 1 wherein at least one of said braces is a z-shaped brace.

7. The ramp as set forth in claim 1 wherein at least one of said braces is a folding brace.

8. The ramp as set forth in claim 1 having a non-skid surface applied thereto.

9. The ramp as set forth in claim 1 having means for securing said ramp in a rolled-up position.

* * * * *